(12) United States Patent
Ivanic

(10) Patent No.: US 9,664,224 B2
(45) Date of Patent: May 30, 2017

(54) RING NUT

(75) Inventor: Ranko Ivanic, Bruck an der Mur (AT)

(73) Assignee: PEWAG AUSTRIA GMBH, Kapfenberg (AT)

( * ) Notice: Subject to any disclaimer, the term of this patent is extended or adjusted under 35 U.S.C. 154(b) by 146 days.

(21) Appl. No.: 14/418,279

(22) PCT Filed: Jul. 31, 2012

(86) PCT No.: PCT/EP2012/064972
§ 371 (c)(1),
(2), (4) Date: Apr. 16, 2015

(87) PCT Pub. No.: WO2014/019614
PCT Pub. Date: Feb. 6, 2014

(65) Prior Publication Data
US 2015/0300399 A1 Oct. 22, 2015

(51) Int. Cl.
| | | |
|---|---|---|
| F16B 45/00 | (2006.01) | |
| F16B 39/26 | (2006.01) | |
| B60P 7/08 | (2006.01) | |
| B66C 1/66 | (2006.01) | |
| F16G 15/08 | (2006.01) | |

(52) U.S. Cl.
CPC ............ *F16B 39/26* (2013.01); *B60P 7/0807* (2013.01); *B66C 1/66* (2013.01); *F16G 15/08* (2013.01); *F16B 45/00* (2013.01)

(58) Field of Classification Search
CPC . F16B 45/00; F16B 35/06; B66C 1/66; F16G 15/08

USPC .................................................. 411/400, 401
See application file for complete search history.

(56) References Cited

U.S. PATENT DOCUMENTS

| | | | | | |
|---|---|---|---|---|---|
| 5,054,982 | A | * | 10/1991 | Freeman | B66C 1/66 24/598.9 |
| 5,286,130 | A | * | 2/1994 | Mueller | B66C 1/66 294/215 |
| 5,580,110 | A | * | 12/1996 | Lecourt | B66C 1/66 294/219 |

(Continued)

FOREIGN PATENT DOCUMENTS

| | | |
|---|---|---|
| DE | 200 01 153 U1 | 8/2000 |
| DE | 100 02 899 A1 | 8/2001 |

(Continued)

*Primary Examiner* — Flemming Saether
(74) *Attorney, Agent, or Firm* — Christensen, Fonder, Dardi & Herbert PLLC

(57) ABSTRACT

A ring nut. A suspension ring includes a base having a sleeve with a threaded bore that is rotatably mounted in a penetration opening. The sleeve is supported by a circumferential annular collar at a bearing surface, surrounding the penetration opening, that is on an exterior at the end of the sleeve facing away from the underside of the base with a non-rotationally symmetrical head profile. The sleeve protrudes at the lower end into a central opening of a disc resting against the underside of the base and is connected thereto in a rotationally fixed manner but does not project at the underside from the disc. A locking member on the base can be brought into a locking position, cooperating with the head profile for locking in the rotational direction, and into a neutral position where the head profile is released in the direction of rotation.

11 Claims, 2 Drawing Sheets

(56) References Cited

U.S. PATENT DOCUMENTS

| | | | | |
|---|---|---|---|---|
| 5,690,457 A | * | 11/1997 | Smetz | B66C 1/66 |
| | | | | 411/400 |
| 6,293,600 B1 | * | 9/2001 | Lecourt | B66C 1/66 |
| | | | | 294/215 |
| 6,994,501 B2 | * | 2/2006 | Smetz | F16G 15/08 |
| | | | | 411/400 |
| 9,188,151 B2 | * | 11/2015 | Ivanic | B60P 7/0807 |
| 2012/0099922 A1 | * | 4/2012 | Horikawa | B66C 1/66 |
| | | | | 403/79 |

FOREIGN PATENT DOCUMENTS

| EP | 2 361 870 A1 | 8/2011 |
|---|---|---|
| WO | WO 2012/072095 A1 | 6/2012 |

* cited by examiner

RING NUT

RELATED APPLICATIONS

This application is a National Phase entry of PCI Application No. PCT/EP2012/064972, filed Jul. 31, 2012, the disclosure of which is incorporated by reference in its entirety.

BACKGROUND

In practice, non-rotatable ring nuts are frequently used in order to enable tool-less assembly and disassembly. The disadvantage of such non-rotatable ring nuts, however, is that they cannot be aligned in the load direction and, when they are used, there is the danger of their coming unscrewed or being overwound. The ring or the threaded bolt can bend and even break, which results in an increased risk of injury in the work environment and for the user.

To avoid this, it is generally recommended that only rotatable ring nuts be used for multistrand or lateral applications. However, these cannot be screwed in and unscrewed without an additional tool (cable wrench, ring wrench, etc.).

Such a ring nut of the type mentioned at the outset is known from DE 100 02 899 A1. In that case, the threaded hole for screwing in a threaded pin is formed by the hole of a sleeve supported in a penetration opening of the base part of the ring nut, one end of which sleeve protrudes somewhat over the underside of the base part of the connecting sleeve in the assembled state. In this known ring nut, through the use of a sleeve rotatably arranged in the base part and having the threaded bore for receiving the load to be mounted, the advantage is achieved that the connecting sleeve can be adjusted according to the force introduced into it. However, these known ring nuts cannot be screwed in and unscrewed with an additional tool.

Taking this as a point of departure, it is the object of the invention to further develop such a ring nut such that it can be used without an additional tool (such as a cable wrench, ring wrench, etc.) for screwing in and unscrewing while providing simple and time-saving handling for the user.

SUMMARY

The invention relates to a ring out comprising a suspension ring forming a base part in its lower region in which a sleeve with a bore open to the underside of the base part is rotatably seated in a penetration opening, the sleeve being supported by means of a circumferential annular collar thereon on a bearing surface surrounding the penetration opening on the base part and being provided on the exterior at the end region facing away from the underside of the base part with a non-rotationally symmetrical head profile.

According to the invention, this object is achieved in a ring nut of the type mentioned at the outset in that the sleeve protrudes at its lower end region into a central opening of a disc resting against the underside of the base part and is connected thereto in a rotationally fixed manner but does not project at its underside from the disc, and that, on the base part, adjacent to the head profile of the sleeve, at least one locking member is provided which can be brought into a locking position in which it cooperates with the head profile and locks it in the rotational direction and into a neutral position in which it releases the head profile in the direction of rotation.

In the ring nut according to the invention, through the use of at least one adjustable locking member on the base part, particularly adjacent to the head profile of the sleeve, it is achieved that at least one locking member, when brought into its locking position, can cooperate with the head profile such that it locks it in the rotational direction. However, when the locking member is brought into its neutral position, it releases the head profile in the direction of rotation, whereby the sleeve can freely rotate within the base part of the ring nut.

At the same time, by protruding at its lower end region into a central opening of a disc resting against the underside of the base part and being rotatably connected thereto but not protruding from it at its lower end, the sleeve ensures that the mounted load comes to rest against the disc mounted on the underside of the base part upon screwing in of the stop point and that the sleeve can then rotate in the direction of rotation together with the sleeve upon release of the rotational lock, since it is rotatably connected thereto. Since the sleeve does not protrude over the disc on the underside of the disc, the load to be mounted rests on the underside of the disc over a relatively large surface and not, for instance, only on the underside of the sleeve as would be the case if the sleeve protruded there somewhat.

It is not necessary to use an additional tool, such as an assembly tool for screws and nuts and the like, in order to assemble the ring nut according to the invention, because rotational locking of the sleeve is achieved solely through the displacement of the at least one locking member on the base part of the suspension ring by bringing the at least one locking member into one of its two end positions and the release of the rotational lock by bringing the at least one locking member into its other adjustment position.

Moreover, the ring nut according to the invention is also constructed such that it is not only rotatable but is also kept in the assembled state as a unit through the attachment of the sleeve to the disc and the supporting of the sleeve on the bearing surface within the suspension ring.

The rotational locking of the sleeve by the locking member in its locking position can be achieved in any suitable manner. It is especially preferred, however, if the locking member is embodied and arranged such that it rotationally locks the head profile of the sleeve in a positive-fitting manner in its locking position.

Any suitable non-rotationally symmetrical shape can be used as the non-rotationally symmetrical head profile for the sleeve which cooperates with the locking member. Especially preferably, however, the head profile is embodied as a hexagon head.

In another preferred embodiment of the ring nut according to the invention, two locking members opposing each other radially with respect to the sleeve are provided, each of which can be brought into a locking position and into a neutral position, so that in order to rotationally lock the sleeve, the two locking members on the head profile engage on two locking members offset with respect to each other by 180° on the periphery thereof.

According to another especially preferred embodiment of the invention, a provision is made that each locking member is releasably locked, preferably by means of a detent spring, in its neutral position and/or in its locking position.

Many types of attachment can be used to attach the sleeve to the disc. It is very especially advantageous, however, if the sleeve is welded or adhered to the disc or the two are screwed together. The connection can also be achieved by pressing the sleeve into the central bore of the disc or by means of an undercut in the sleeve or disc or by flanging a previously existing over-material, similar to riveting. In each case, the rotatability of the sleeve in the base part of the suspension ring must be ensured by the connection used and the ring nut must be held in the assembled state as a unit.

The design of each locking member can be embodied in any suitable shape that makes it possible to move or displace the locking member in the manner of the invention between a locking position for rotationally locking the sleeve and a starting position in which no engagement with the sleeve occurs. It is very especially advantageous, however, if each locking member is embodied as a tilt lever which brings about the desired rotational locking of the head profile and hence of the sleeve in one tilted end position, while it releases the head profile in the direction of rotation in its other tilted end position.

In another very especially preferred embodiment of the ring nut according to the invention, each tilt lever can only be moved from its neutral position into its locking position when it has passed through a predetermined angle of rotation (in the direction toward assumption of the locking position), this predetermined angle of rotation very especially preferably being 110". This means that, in order to assume the locking position out of the neutral position, the tilt lever in question must be actively moved by the operator by at least this angular range in order for it to then continue running into the other end position, namely into its locking position. However, if the tilt lever is not moved by the operator by this predetermined angle in the direction of the locking position, the tilt lever, if its movement in this direction is not actively continued before reaching the predetermined angle of rotation, will either remain in the assumed position or preferably return automatically to its starting position (neutral position), depending on its design. By virtue of this embodiment of the ring nut according to the invention, the danger of unintentional movement of the tilt lever into its locking position is eliminated.

In one preferred embodiment of the tilt lever according to the invention, each such tilt lever is seated in an upper notch to the side of the penetration opening on the base part, this notch being aligned perpendicular to the middle axis of the penetration opening of the base part and the tilt lever being seated on a swivel axle lying perpendicular to the alignment of the notch which, in turn, is supported by a retaining bracket attached in the notch which comprises a U-shaped cross section with two lateral arms connected together by a center bar. This results in a space-saving embodiment and arrangement of the tilt lever on the suspension ring or the base part thereof, the overall arrangement being simple and easy to assemble, and this embodiment of the tilt levers can easily be put into the two tilted end positions of the tilt lever by an operator.

Each tilt lever is preferably provided on its underside facing toward the retaining bracket with a shape that engages with a spring bar protruding from the center bar of the retaining bracket such that, in the event of a tilting movement of the tilt lever, it elastically deforms the spring bar upon running over it, and the spring bar, upon reaching its tilted end position, assumes its initial shape again in which it locks the tilt lever in the respective tilted end position by means of its shape. This embodiment is again very space-saving, simple in its construction, effective in its function and also suitable for transferring very large torques from the suspension ring to the sleeve.

In the ring screw according to the invention, it is no longer necessary to use a separate tool to activate the locking member, thus also eliminating the danger of losing the tool. The mounting of the at least one locking member radially next to the head profile of the sleeve and the attachment thereof to the base part leads overall to an extraordinarily space-saving arrangement in which the locking member can be structured such that it no longer protrudes over the exterior circumferential surface of the base part, thus enabling use of the ring nut according to the invention even in a tight space if the suspension ring is even rotatable there due to the predetermined shape it is given.

BRIEF DESCRIPTION OF THE DRAWINGS

The invention is explained in further detail below with reference to the drawings, which are to be understood as examples in principle.

DETAILED DESCRIPTION

Figure 1:
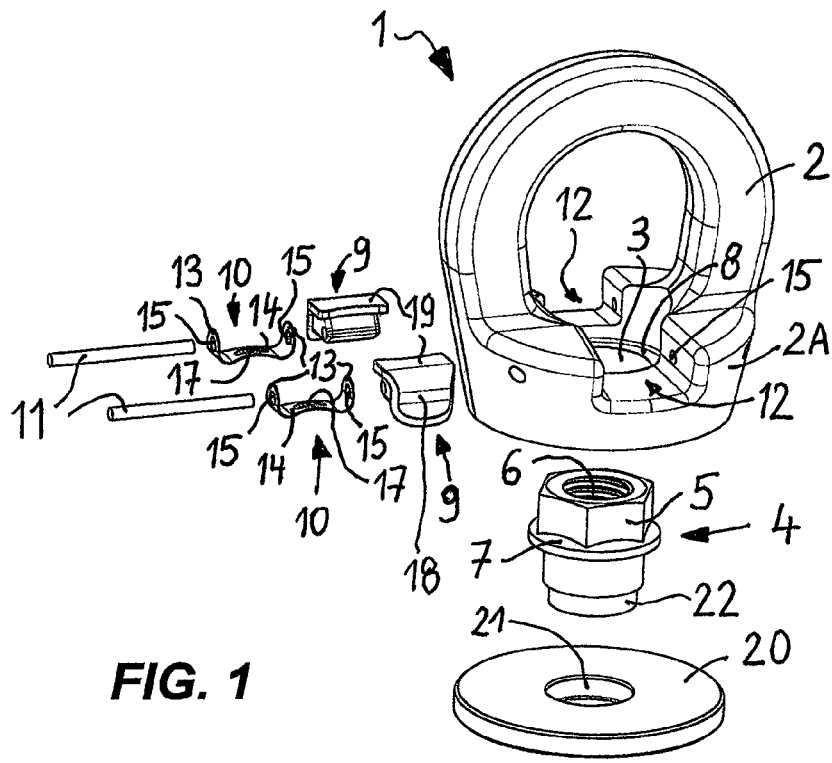
FIG. 1 shows a perspective, exploded view of a ring nut according to the invention.

The figures show a ring screw 1 comprising a suspension ring 2 which forms a base part 2A on its lower segment in which a penetration opening 3 is provided for insertion of a sleeve 4 (cf. FIG. 1).

The sleeve 4 is provided on its upper end region facing toward the suspension ring 2 on its exterior with a head profile 5 and has a central inner bore with an internal thread 6 (cf. FIG. 1) which is provided over the entire axial length of the sleeve 4 in the depicted exemplary embodiment.

A screw, a screw bolt, or the like (not shown) can be screwed into the internal thread 6 from the lower side of the sleeve 4 facing away from the suspension ring 2 by means of which an object or a load can be coupled with the sleeve 4 of the ring nut 1.

Figure 2:
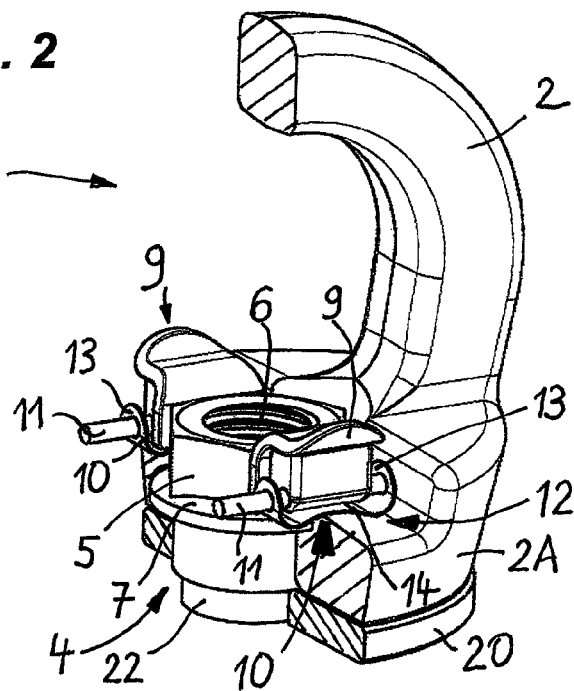
FIG. 2 shows a perspective view of the ring nut from FIG. 1 in the assembled state, but with the suspension ring with its base part being cut on a plane running through the longitudinal axis of its penetration opening.

The head profile 5 at the upper end region of the sleeve 4 is embodied in the form of a hexagon head which is seated on a circumferential ring shoulder 7 of the sleeve 4 which lies with its underside on a flat bearing surface 8 embodied on the base part 2A of the suspension ring 2 and surrounding the penetration opening 3 and is supported downwardly on same (FIGS. 1, 2).

The perspective representation of FIG. 2 shows the suspension ring 2 from FIG. 1 in the assembled state, but with the suspension ring 2 and its base part 2A being cut on a vertical center plane (on which the center axis of the sleeve 4 also lies), whereas the other elements of the ring nut 1 are shown in uncut form.

It can be seen from the illustration of FIG. 2 that the sleeve 4 is inserted through the penetration opening 3, the circumferential ring shoulder 7 of the sleeve 4 resting on the flat bearing surface 8 of the base part 2A.

The sleeve 4 inserted through the penetration opening 3 is provided in its lower end region, that is, in the end region facing away from the suspension ring 2, with an end step 22 having a smaller diameter than the remaining diameter of the penetration opening 3 which protrudes into a central bore 21 of a lower disc 20 (cf. FIG. 2) and is connected in a suitable manner to this disc 20 in the assembled state, for instance by screwing, welding, adhesion, pressing or in another suitable manner resulting in a rotationally fixed connection between the disc 20 and the sleeve 4, so that the two parts form a structural unit in the assembled state, thus forming, as a result of the supporting of the sleeve 4 via its circumferential ring shoulder 7 on the flat bearing surface 8 of the base part 2A of the suspension ring 2 on the one hand and the supporting of the disc 20 on the underside of the base part 2A on the other hand, the overall arrangement of suspension ring with base part 2A, sleeve 4 running through the penetration opening 3 and disc 20 mounted below to form a self-contained unit.

The lower end step 22 of the sleeve 4 has an axial length which is somewhat shorter than the thickness of the disc 20, so that the sleeve 4 on the underside of the disc 20 does not protrude outwardly beyond its lower end surface in the assembled state.

In the assembled state, if a load, for example through a threaded bolt (not shown in the figures), is attached from the underside to the ring nut 1 by screwing its thread into the internal thread 6 of the sleeve 4, then this threaded bolt is screwed into the internal thread 6 of the sleeve 4 until the upper side of the load to be mounted by means of it comes to rest on the underside of the disc 20.

Once this assembly has been completed, the tilting members 9 are tilted from their locking position into which they had been brought for assembly back into their neutral starting position, thus releasing the head profile 5 of the sleeve 4, so that the sleeve 4 can then be rotated within the penetration opening 3 of the suspension ring 2 relative thereto in order to enable itself to be aligned optimally within the ring nut 1 in the load direction.

During the rotational movement required for this, however, the unit of sleeve 4/disc 20 rotates together, so that the rotation of the coupled load can occur without relative movement between the upper side of the load and the underside of the disc 20. Relative movement does occur, however, between the upper side of the disc 20 and the underside of the base part 2A of the suspension ring 2, and the resulting frictional forces can be optimized either through optimal friction pairing of the material on the surface of the disc 20 and the underside of the base part 2A (by applying suitable friction overlays, for instance), or, in the assembled state as well, the position of the disc 20 on the underside of the base part 2A is set such that there is a very small amount of backlash between the two, which permits rotation of the disc 20 relative to the base part 2A with practically no frictional forces between the upper side of the disc 20 and the underside of the base part 2A when the load is mounted, so that the only frictional forces active during rotation are those between the sleeve 4 and the wall of the penetration opening 3 in the base part 2A and between the ring shoulder 7 and the bearing surface 8 of the base part 2A on which the ring shoulder 7 of the sleeve 4 is supported.

Furthermore, as can be seen in FIGS. 1 and 2, the ring nut 1 also has two tilt levers 9, two retaining brackets 10 for them and two swivel axles 11, each of which is used for the tiltable arrangement of a tilt lever 9 on a retaining bracket 10.

As can also be seen from FIGS. 1 and 2, a recess 12 is respectively formed from above in the upper region of the base part 2A adjacent to the penetration opening 3 for receiving the sleeve 4 on both sides of the penetration opening 3.

The two recesses 12 are arranged such that they lie radially opposite each other with respect to the center axis of the penetration opening 3 and are aligned with respect to each other, i.e., the alignment of the two recesses 12 runs perpendicular to the longitudinal center axis of the sleeve 4 and simultaneously also perpendicular to the clamping plane of the suspension ring 2, as can be seen especially well in the representation of FIG. 1.

Figure 5:
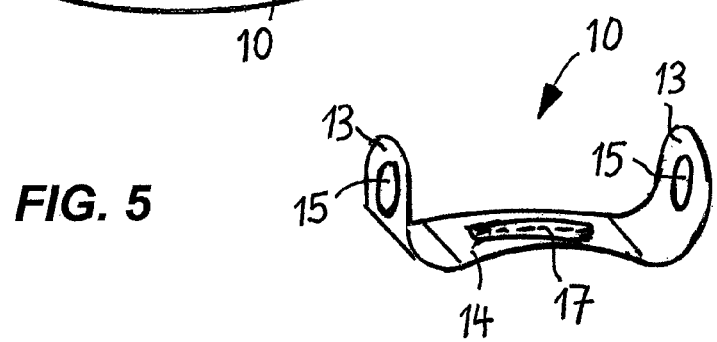
FIG. 5 shows an enlarged perspective view of a retaining bracket used for the storage of a locking member.

Seated in each recess 12 is a respective retaining bracket 10 as shown in detail in FIG. 5. As can be seen, each retaining bracket 10 has two lateral arms 13 which lie parallel to each other and are connected to each other at one of their ends via a respective center bar 14.

An opening 115 is embodied in each lateral arm 13, the two openings 15 of the lateral arms 13 being aligned with respect to each other such that a respective swivel axle 11 (cf. FIG. 1) can be inserted through them on which a tilt lever 9 can swivel and which is seated so as to be guided laterally and in the swiveling direction. This state is shown in FIG. 2.

Figure 4:
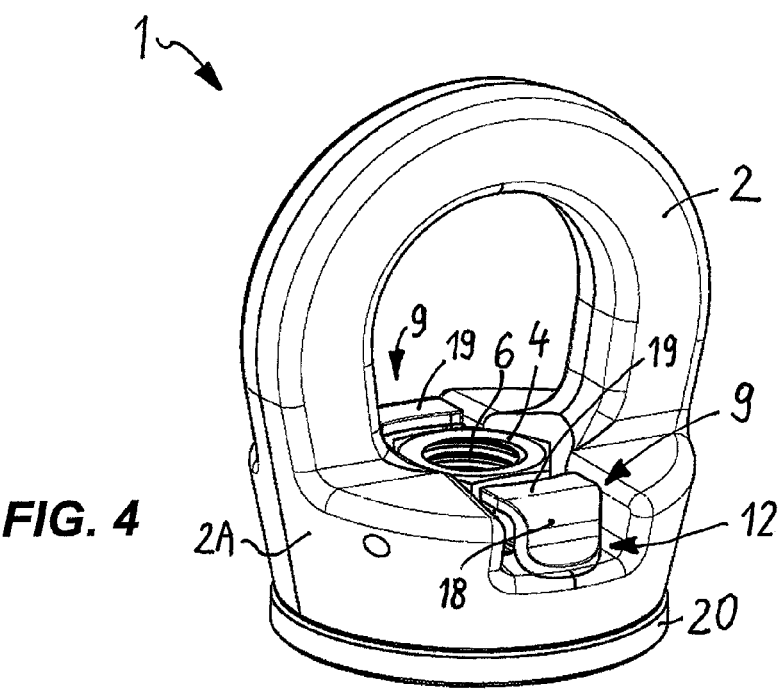
FIG. 4 shows the ring nut from FIG. 3, but with the locking members in their neutral position.

The depth and width of the recesses 12 (when seen parallel to the clamping plane of the suspension ring 2) are such that, when tilt levers 9 are mounted in each of them in their starting position as shown in FIG. 4 (neutral position in which there is no engagement with the head profile 5 of the sleeve 4), the respective upper surface of the tilt lever 9 lies approximately at the surface level of the base part 2A of the suspension ring 2 present to the side of the recess 12. The width of each recess 12 is selected such that the associated retaining bracket 10 and the corresponding tilt lever 9 can be mounted therein with some lateral backlash.

The swivel axle 11 for each tilt lever 9 is longer than the lateral width of the respective recess 12, with the swivel axle 11 protruding on both sides of the recess 112 into a respective bearing opening 15 arranged therein laterally in the base part 2A. The respective tilt lever 9 can either be seated in a swivelable manner on the associated swivel axle 11, which can be mounted in the bearing openings 15 in a rotationally fixed manner with a solid seat, or each tilt lever 9 can also be solidly mounted on the swivel axle 11 and provided in a swiveling manner therewith in the openings 15 in the lateral arms 13 of each retaining bracket 10 and in the bearing openings 16.

FIG. 5 shows an enlarged perspective representation of such a retaining bracket 10.

As can be seen from FIG. 5, an upwardly arched spring bar 17 is provided in the form of a resilient arch in the center region of the center bar 14 of the retaining brackets 10 which is shifted somewhat with respect to the position of the openings 15. This spring bar 17 is seated on the center bar 14 of the retaining bracket 10 such that, when pressure is exerted from above on the spring bar 17, it is deformed such that the radius of curvature of its arch is greater and the arch itself therefore becomes flatter, the spring bar 17 being mounted on the retaining bracket 10 such that it is able to compensate for a change in length relative to the center bar 14 of the retaining bracket 10 occurring when it is pressed flat.

On the underside of each tilt lever 9 facing toward the center bar 14 of the retaining bracket 10, the tilt lever 9 is provided in its center region, which corresponds in the assembled state to the position of the spring bar 17 in the retaining bracket 10, with a shape which is such that it contacts and engages with the spring bar 17 of the retaining bracket 10 when the tilt lever 9 is tilted. When the tilt lever 9 is tilted, a projection mounted on its underside coming from one side of the center bar 14 of the retaining bracket 10 meets the spring bar 17 and runs beyond it, the spring bar 17 being pressed downward and elastically deformed. It presses with its elastic restoring force against the abovementioned projection. A soon as the projection has been guided beyond the center of the spring bar 17, the latter presses with its elastic restoring force against a lateral flank of this projection, with the consequence that the projection is resiliently biased in the tilting direction and pressed into the corresponding tilted end position. This applies to both tilting directions of the tilt lever 9, and it can be ensured through appropriate structuring of the projection thereon that it is still loaded in each of the two tilted end positions of the tilt lever 9 with a certain elastic restoring force of the spring bar 17 and is thus held in this tilted end position under resilient bias. By means of a locking device (not shown in the figures, it can also be achieved that the tilt lever 9 is locked in each of its two swiveling end positions.

Furthermore, as shown in the illustration of FIG. 1, each tilt lever 9 consists of a first tilt lever arm 18 and a second tilt lever arm 19 mounted at an approximately 90° angle thereto (cf. FIGS. 1 and 4).

In the neutral position of the tilt lever 9, in which it is not engaged with the head profile 5 of the sleeve 4 and the latter can rotate freely in the penetration opening 3 of the suspension ring 2 (cf. FIG. 4), each tilt lever 9 is tilted such that it is dumped into its external tilted end position, in which it is supported via the first tilt lever arm 18 on or in the recess 12. The second tilt lever arm 19 is tilted upward, and its outer surface lies perpendicular to the longitudinal center axis of the penetration opening 3.

Figure 3:
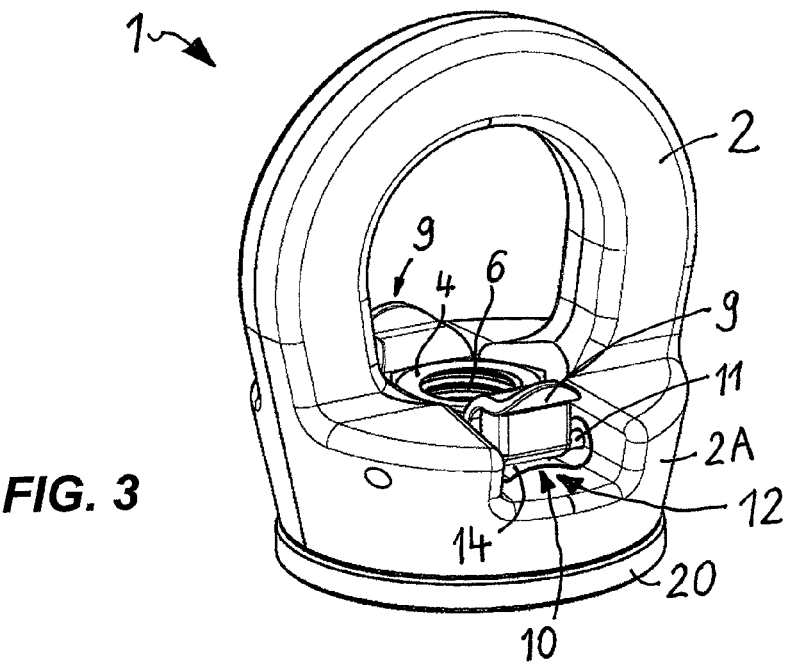
FIG. 3 shows an inventive ring nut according to FIGS. 1 and 2 in a perspective view in the assembled state and in the locking position of the locking members.

When the tilt lever 9 is now tilted into its locking position, as shown in FIGS. 2 and 3, it is supported in this tilt lever end position on the second tilt lever arm 19 which, as these figures show, then rests with its outer side against a side surface of the hexagon head of the head profile 5 of the sleeve 4 facing it and is held in this position under resilient bias through the spring bar 17, which presses against the projection on the tilt lever 9.

In this locking position, it is no longer possible for the sleeve 4 to rotate with respect to the base part 2A and suspension ring 2, because the outer contour of the hexagon head of the head profile 5 is locked in the rotational direction by the bilateral abutment of the outer surfaces of the two tilt lever arms 19 of the two tilt levers 9 with respect to the suspension ring 2.

In this locking position, torque can be transferred through rotation of the ring nut 1 via the tilt lever 9 and the head profile 5 to the sleeve 4, whereby the screwing-in of a threaded bolt or the like can be performed in order to attach a body to be mounted on the ring nut 1. However, as soon as the tilt lever 9 has tilted back into its other tilt lever end position, namely the neutral position, the sleeve 4 can rotate again relative to the suspension ring 2 with the load mounted on it.

The shape of the elements cooperating during tilting of the tilt levers 9 can not only be selected such that a predetermined biasing of the resilient force pressing it into its tilted end position is achieved in every tilted end position of a tilt lever 9. Rather, the elements can also be shaped such that a certain predetermined amount of swiveling of a tilt lever 9 out of each of its end positions must first be overcome before the elastic restoring force of the spring bar 17 presses the tilt lever 9 tilted to that point to its other tilted end position under a bias; this is to prevent it from being moved inadvertently and unintentionally from its tilted end position.

If desired, it is possible to provide the sleeve 4 at its upper end with a shaped head, such as a hexagonal shaped head, in order to also enable assembly using a tool having the corresponding wrench size.

What is claimed is:

1. A ring nut, comprising:
   a suspension ring including a base part, said base part defining a penetration opening and including a bearing surface surrounding said penetration opening on an underside of said base part;
   a disc in contact with said underside of said base part, said disc defining a central opening;
   a sleeve defining a threaded bore and including a first end and a second end separated by an annular collar, said first end being disposed in said penetration opening and defining a non-rotationally symmetric head profile that is rotatable within said penetration opening with said annular collar seated against said bearing surface, said second end being disposed in said central opening and rotationally fixed to said disc, said second end not projecting through said central opening of said disc; and
   at least one locking member operatively coupled to said base part of said suspension ring and disposed adjacent to said non-rotationally symmetric head profile, said at least one locking member being selectively configurable in a locking position and in a neutral position,
   wherein, when in said locking position, said at least one locking member cooperates with said non-rotationally symmetric head profile to prevent rotation of said sleeve relative to said suspension ring, and
   wherein, when in said neutral positon, said at least one locking member releases said non-rotationally symmetric head profile to enable rotation of said sleeve relative to said suspension ring,
   wherein each of said at least one locking member is a tilt lever that is seated in a respective notch defined adjacent said penetration opening, said notch being in a perpendicular alignment with a middle axis of said penetration opening, each tilt lever being seated on a respective swivel axle that is perpendicular to said perpendicular alignment of said notch, each tilt lever being supported by a respective retaining bracket coupled to said notch, said retaining bracket defining a U-shaped cross section having two lateral arms that extend from a center bar.

2. The ring nut of claim 1, wherein said at least one locking member locks said non-rotationally symmetric head profile of said sleeve in a positive-fitting manner when in said locking position.

3. The ring nut of claim 1, wherein said non-rotationally symmetric head profile of said sleeve defines a hexagonal head.

4. The ring nut of claim 1, wherein said at least one locking member includes two locking members opposing each other radially with respect to said sleeve.

5. The ring nut of claim 1 wherein each of said at least one locking member is releasably locked in at least one of said neutral position and said locking position.

6. The ring nut of claim 1, wherein said sleeve is welded to said disc.

7. The ring nut of claim 1, wherein said sleeve is screwed to the disc.

8. The ring nut of claim 1, wherein said sleeve is connected to said disc by adhesion.

9. The ring nut of claim 1, wherein each tilt lever can only be moved from said neutral position into said locking position by passing through a predetermined angle of rotation.

10. The ring nut of claim 9, wherein said predetermined angle of rotation is 110°.

11. The ring nut of claim 1, wherein:
- each tilt lever includes a respective projection and said center bar of said respective retaining includes a spring bar protruding therefrom;
- said projection elastically deforms said spring bar when said tilt lever is rotated from said neutral position to said locking position; and
- said spring bar assuming an initial shape when in either of said neutral position or said locking position to lock said tilt lever in position.

* * * * *